United States Patent
Lee

(10) Patent No.: US 9,752,641 B2
(45) Date of Patent: Sep. 5, 2017

(54) MAGNETORHEOLOGICAL DAMPER

(71) Applicant: MANDO CORPORATION, Pyeongtaek-si, Gyeonggi-do (KR)

(72) Inventor: Yoon Hyun Lee, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/064,400

(22) Filed: Mar. 8, 2016

(65) Prior Publication Data

US 2016/0265617 A1    Sep. 15, 2016

(30) Foreign Application Priority Data

Mar. 10, 2015    (KR) .................... 10-2015-0033428

(51) Int. Cl.
*F16F 9/53*    (2006.01)

(52) U.S. Cl.
CPC .................... *F16F 9/535* (2013.01)

(58) Field of Classification Search
CPC .............. F16F 9/535; F16F 9/3228
USPC ................. 188/267.2, 267, 322.22
See application file for complete search history.

(56) References Cited

U.S. PATENT DOCUMENTS

| | | | |
|---|---|---|---|
| 6,336,535 B1* | 1/2002 | Lisenker | F16F 9/535 188/267 |
| 6,386,343 B1* | 5/2002 | Robinson | F16F 9/3405 188/267 |
| 6,390,252 B1* | 5/2002 | Namuduri | F16F 9/535 188/267 |
| 6,547,044 B2* | 4/2003 | Lisenker | B60G 13/008 188/267 |
| 6,612,409 B2* | 9/2003 | Lun | F16F 9/535 188/267.2 |

(Continued)

FOREIGN PATENT DOCUMENTS

| JP | 2009-216206 A | 9/2009 |
|---|---|---|
| KR | 10-2009-0029046 A | 3/2009 |

OTHER PUBLICATIONS

Korean Office Action dated Jul. 4, 2016 issued in Korean Patent Application No. 2009-216206 (partial translation).

*Primary Examiner* — Thomas J Williams
*Assistant Examiner* — Mariano Sy
(74) *Attorney, Agent, or Firm* — McDermott Will & Emery LLP

(57) ABSTRACT

Provided is a magnetorheological (MR) damper, which includes a cylinder filled with an MR fluid, a piston rod extending to the outside of the cylinder, and a magnetic generator partitioning the inside of the cylinder into a compression chamber and a rebound chamber in a state of being connected to the piston rod and generating an electromagnetic force to the inside, the MR damper including: a magnetic core connected to a lower end of the piston rod; a flux ring connected to an edge of the magnetic core, such that a side surface of the flux ring tightly contacts an inner peripheral surface of the cylinder, the flux ring being formed to vertically penetrate through a main passage between the flux ring and the magnetic core; and a cutaway groove concavely formed at a side surface of the magnetic core and preventing a magnetic force from being unnecessarily formed at a setting portion of the main passage, such that the MR fluid is vertically bypassed during compression and rebound strokes.

5 Claims, 4 Drawing Sheets

(56) References Cited

U.S. PATENT DOCUMENTS

| | | | |
|---|---|---|---|
| 6,637,560 B2* | 10/2003 | Oliver | F16F 9/061 188/322.19 |
| 6,874,603 B2* | 4/2005 | Lisenker | F16F 9/535 188/267.2 |
| 7,950,508 B2* | 5/2011 | Jin | F16F 9/3228 188/267.2 |
| 2004/0118646 A1* | 6/2004 | Lun | F16F 9/535 188/267 |
| 2004/0134728 A1* | 7/2004 | Lisenker | F16F 9/535 188/267.2 |
| 2015/0204407 A1* | 7/2015 | Lun | F16F 9/3278 188/322.16 |

* cited by examiner

MAGNETORHEOLOGICAL DAMPER

CROSS-REFERENCE(S) TO RELATED APPLICATION

This application claims priority of Korean Patent Application No. 10-2015-0033428, filed on Mar. 10, 2015, in the Korean Intellectual Property Office, which is hereby incorporated by reference in its entirety.

BACKGROUND OF THE INVENTION

Field of the Invention

The present invention relates to a magnetorheological (MR) damper, and more particularly, to an MR damper, in which since a bypass space that is not affected by an electromagnetic field is secured by forming a cutaway groove penetrating in a direction of compression and rebound strokes at a side surface of a magnetic core, the cutaway groove is formed corresponding to both directions, so that it is unnecessary to match a direction of a passage to thereby achieve ease of assembling, and it is unnecessary to form a bypass holes in an upper plate and a lower plate to thereby reduce processing costs.

Description of the Related Art

In general, a magnetorheological (MR) damper refers to a device that generates an electromagnetic field due to an electric current applied from the outside and changes a damping force through a change in a viscosity of an MR fluid.

The MR damper includes a cylinder which is filled with an MR fluid (magnetic fluid), a piston rod which reciprocates within the cylinder, a piston which is connected to the piston rod, and an electromagnetic field generator which generates an electromagnetic field.

The piston includes a magnetic core which forms a bypass passage and around which a coil is wound, a flux ring which is connected in a state of surrounding the outside of the magnetic core and forms a main passage, and plates which are respectively connected to the upper and lower sides of the flux ring and the magnetic core and form passages to communicate with the bypass passage.

In the MR damper, the MR fluid passes through the main passage during compression and rebound strokes of the piston rod. At this time, the MR fluid is not affected by resistance in a state in which the electric current is being applied from the outside.

On the other hand, in a state in which the electric current is being applied, an electromagnetic field is formed over the outer peripheries of a solenoid, the piston, and the cylinder. This increases the viscosity of the MR fluid existing within the passage. At this time, the piston generates a high damping force while sliding along the high-viscosity fluid.

However, in an existing MR damper, a passage communicating with a bypass hole needs to be formed in the plate. Thus, it costs much to form the passage, and the direction of the passage formed in the plate needs to be matched, making assembling difficult.

In addition, in the existing MR damper, the bypass hole is formed adjacent to the central axes of the magnetic core and the plate. Thus, it is difficult to ensure a space for installing an anti-collision stop rubber.

As the prior art document related to the present invention, Korean Patent Application Laid-Open No. 10-2012-0129580 (Nov. 28, 2012) discloses an MR damper.

SUMMARY OF THE INVENTION

An object of the present invention is to provide an MR damper, in which since a bypass space that is not affected by an electromagnetic field is secured by forming a cutaway groove penetrating in a direction of compression and rebound strokes at a side surface of a magnetic core, the cutaway groove is formed corresponding to both directions, so that it is unnecessary to match a direction of a passage to thereby achieve ease of assembling, and it is unnecessary to form a bypass holes in an upper plate and a lower plate to thereby reduce processing costs.

In addition, another object of the present invention is to provide an MR damper, in which since a bypass space can be formed in a part of a main passage, it is possible to easily secure an installation space of a stop rubber and prevent interference between the stop rubber and the bypass space.

According to the present invention, there is provided an MR damper, which includes a cylinder filled with an MR fluid, a piston rod extending to the outside of the cylinder, and a magnetic generator partitioning the inside of the cylinder into a compression chamber and a rebound chamber in a state of being connected to the piston rod and generating an electromagnetic force to the inside, the MR damper including: a magnetic core connected to a lower end of the piston rod; a flux ring connected to an edge of the magnetic core, such that a side surface of the flux ring tightly contacts an inner peripheral surface of the cylinder, the flux ring being formed to vertically penetrate through a main passage between the flux ring and the magnetic core; and a cutaway groove concavely formed at a side surface of the magnetic core and preventing a magnetic force from being unnecessarily formed at a setting portion of the main passage, such that the MR fluid is vertically bypassed during compression and rebound strokes.

The MR damper may further include a ring-shaped connection groove at the edge of the magnetic core, such that the magnetic generator is connectable in a state of being inserted into the side surface thereof.

The cutaway groove may vertically penetrate and be formed at upper and lower sides of the magnetic core and a side surface of the connection groove.

The cutaway groove may vertically penetrate and be formed at upper and lower portions of the magnetic core with respect to the connection groove.

An upper plate, in which a first passage vertically penetrates to be connected to an upper end of the main passage, may be further connected to upper portions of the magnetic core and the flux ring. A lower plate, in which a second passage vertically penetrates to be connected to a lower end of the main passage, may be further connected to lower portions of the magnetic core and the flux ring.

A stop rubber may be further connected to a top surface of the upper plate, and an edge of the stop rubber may be spaced apart from an upper end of the cutaway groove.

DETAILED DESCRIPTION OF EXEMPLARY EMBODIMENTS

Hereinafter, preferred embodiments of the present invention will be described in detail with reference to the accompanying drawings.

The advantages and features of the present invention and methods for achieving them will become more apparent from the following embodiments that are described in detail in conjunction with the accompanying drawings.

However, the present invention is not limited to the following embodiments and may be embodied in various forms. These embodiments are provided so that this disclosure will be thorough and complete, and will fully convey the scope of the invention to those skilled in the art. The scope of the present invention is defined by the appended claims.

In addition, detailed descriptions of well-known technologies will be omitted since they would unnecessarily obscure the subject matters of the present invention.

Figure 1:
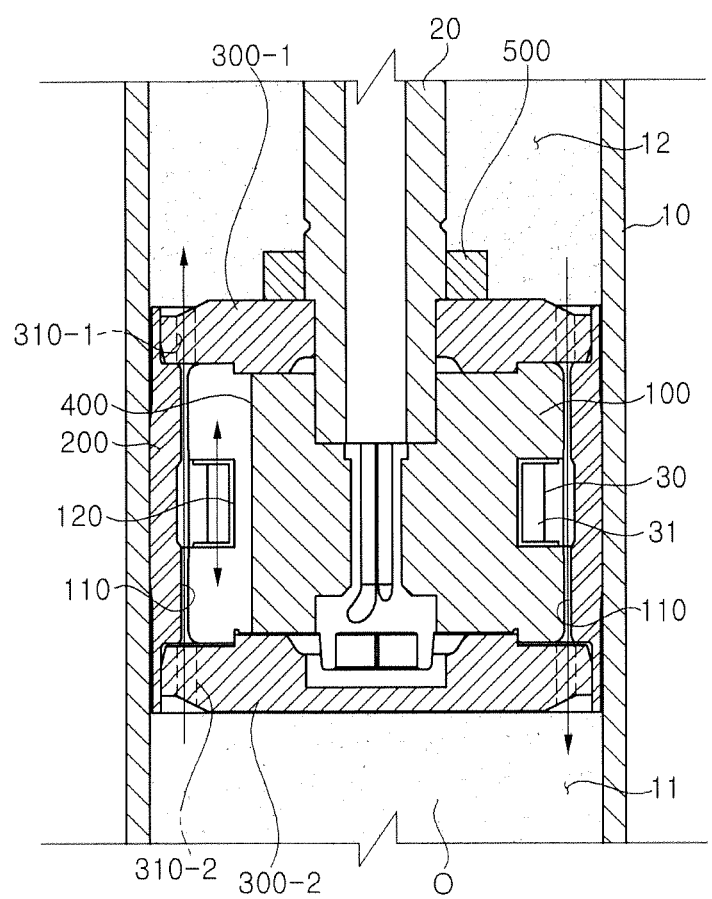
FIG. 1 is a front sectional view of an MR damper according to the present invention.
Figure 2:
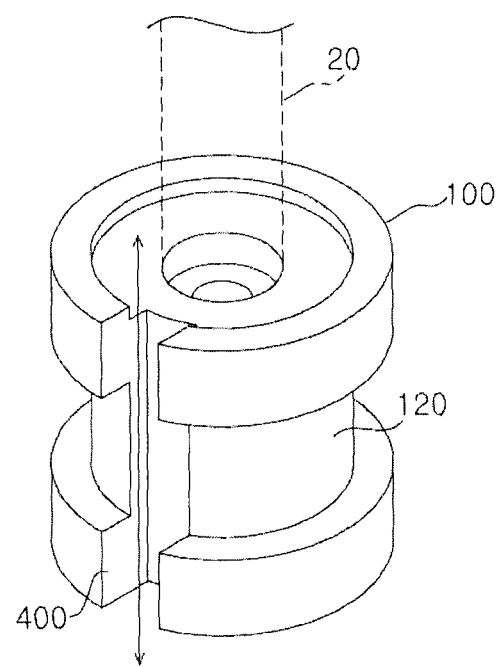
FIG. 2 is a perspective view illustrating a state in which a cutaway groove is vertically formed on a side surface of a magnetic core and a side surface of a connection groove in the MR damper according to the present invention.

FIG. 1 is a front sectional view of an MR damper according to the present invention, and FIG. 2 is a perspective view illustrating a state in which a cutaway groove is vertically formed on a side surface of a magnetic core and a side surface of a connection groove in the MR damper according to the present invention.

Figure 3:
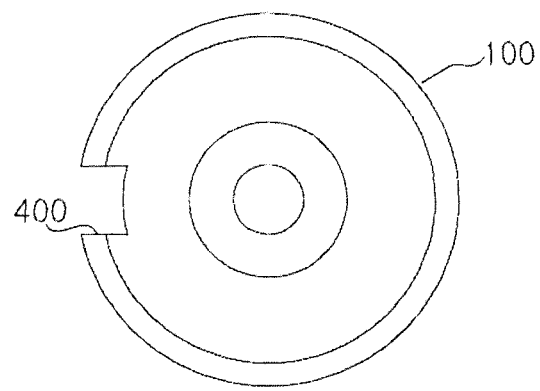
FIG. 3 is a plan view of a magnetic core in the MR damper according to the present invention.
Figure 4:
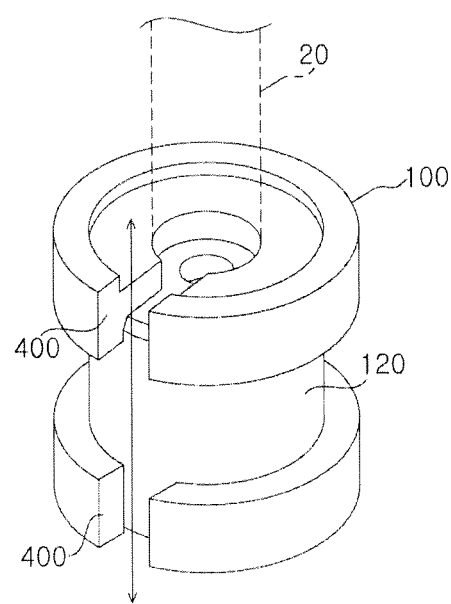
FIG. 4 is a perspective view illustrating a state in which a cutaway groove is vertically formed in upper and lower portions of the magnetic core with respect to the connection groove in the MR damper according to the present invention.

FIG. 3 is a plan view of a magnetic core in the MR damper according to the present invention, and FIG. 4 is a perspective view illustrating a state in which a cutaway groove is vertically formed in upper and lower portions of the magnetic core with respect to the connection groove in the MR damper according to the present invention.

Referring to FIGS. 1 to 4, the MR damper according to the present invention includes a cylinder 10, a piston rod 20, and a magnetic generator 30.

In particular, the MR damper according to the present invention includes a magnetic core 100, a flux ring 200, an upper plate 300-1, a lower plate 300-2, and a cutaway groove 400.

The cylinder 10 has a cylindrical shape to form an inner space, and the cylinder 10 is filled with an MR fluid (magnetic fluid) O.

The inside of the cylinder 10 may be partitioned into a compression chamber 11 at a lower side and a rebound chamber 12 at an upper side by the magnetic core 100 and the flux ring 200, which will be described below.

The MR fluid O may be selectively moved between the compression chamber 11 and the rebound chamber 12 through a main passage 110 formed in the magnetic generator 30.

One end of the cylinder 10 and one end of the piston rod 20, which will be described below, are respectively connected to a vehicle body side or a wheel side. In this state, a shock absorber may perform compression and rebound strokes.

In addition, a separate connection part (not illustrated) for connection to the vehicle body side or the wheel side may be installed below the cylinder 10.

One end of the piston rod 20 is connected to the magnetic generator 30, and the other end of the piston rod 20 extends to the outside of the cylinder 10 and is connected to the vehicle body side or the wheel side of the vehicle.

That is, the piston rod 20 is connected to the vehicle body side or the wheel side of the vehicle and performs the compression or rebound operation together with the above-described cylinder 10.

The magnetic generator 30 is installed inside the cylinder 10. When an electric current is supplied from the outside, the magnetic generator 30 generates a magnetic force to change the viscosity of the MR fluid O that flows through the main passage 110.

For example, when the magnetic generator 30 generates a high electromagnetic force, the viscosity of the MR fluid O is increased, and thus, a high damping force is generated.

On the contrary, when the magnetic generator 30 generates a low electromagnetic force, the viscosity of the MR fluid O is decreased, and thus, a low damping force is generated.

To this end, external power is supplied to the magnetic generator 30. A coil 31 or the like may be installed so as to form a magnetic force up to the outside of the cylinder 10 when power is supplied.

The magnetic core 100 partitions the inside of the cylinder 10 into the compression chamber 11 and the rebound chamber 12 in a state of being connected to one end of the piston rod 20.

The main passage 110 is formed at the edge of the magnetic core 100 at an interval between the magnetic core 100 and the flux ring 200, which will be described below.

When the piston rod 20 performs the compression and rebound strokes, the main passage 110 serves as a passage through which the MR fluid O of the compression chamber 11 and the MR fluid O of the rebound chamber 12 can flow.

The viscosity of the MR fluid O passing through the main passage 110 is changed by the electromagnetic field formed by the magnetic generator 30, and the MR fluid O generates a resistance.

At this time, a main damping force is generated by a change in the resistance of the MR fluid O passing through the main passage 110.

A ring-shaped connection groove 120 may be further formed at the edge of the magnetic core 100, such that the magnetic generator 30 can be connected in a state of being inserted into the side surface thereof.

The flux ring 200 is connected to the edge of the magnetic core 100, and the side of the flux ring 200 moves in a state of tightly contacting the inner peripheral surface of the cylinder 10.

Here, the main passage 110 vertically penetrates between the inner peripheral surface of the flux ring 200 and the outer peripheral surface of the magnetic core 100.

The upper plate 300-1 is connected to the upper sides of the magnetic core 100 and the flux ring 200.

A hollow part vertically penetrates through the center of the upper plate 300-1, such that the lower end of the piston rod 20 can be connected to the magnetic core 100.

In addition, a first passage 310-1 is formed in the upper plate 300-1. The first passage 310-1 is connected to the upper end of the main passage 110 and connects the main passage 110 to the rebound chamber.

A second passage 310-2 is formed in the lower plate 300-2. The second passage 310-2 is connected to the lower end of the main passage 110 and connects the main passage 110 to the compression chamber.

One or more connection holes may be formed in the lower plate 300-2 and the upper plate 300-1.

The cutaway groove 400 is formed at the edge of the magnetic core 100. The cutaway groove 400 allows the MR fluid O to pass therethrough and prevents the magnetic field from being unnecessarily formed at a setting region of the main passage 110.

The cutaway groove 400 is formed by partially cutting the side of the magnetic core 100. As illustrated in FIG. 2, the cutaway groove 400 may be vertically formed at the side surface of the connection groove 120 and the upper and lower sides of the magnetic core 100.

At this time, the cutaway groove 400 is concavely formed in a vertical center direction of the magnetic core 100, and the cutaway groove 400 penetrates in a vertical direction of the magnetic core 100.

Unlike this, as illustrated in FIG. 4, the cutaway groove 400 may be vertically formed at the upper and lower side surfaces of the magnetic core 100 with respect to the connection groove 120.

As such, the cutaway groove 400 further increases the spacing between the setting portion of the magnetic core 100 and the flux ring 200 to thereby form a region where a magnetic material (steel) is eliminated. Therefore, it is possible to make a condition that the magnetic field is not formed between the flux ring 200 and the magnetic core 100 when the magnetic generator 30 is driven.

Since the cutaway groove 400 is formed on the main passage 110 in a communicated state, the cutaway groove 400 forms a space where a part of the MR fluid O passing through the main passage 110 is bypassed.

In addition, since the cutaway groove 400 is formed at the edge of the magnetic core 100, a stop rubber 500 to be described below can be easily installed at the central position of the upper plate 300-1.

For example, if a damping force is reduced at the time of an initial stroke, an initial impact is reduced in a vehicle to thereby improve ride comfort. On the contrary, if a damping force is increased at a maximum stroke point, it is possible to reduce impact generated when a tire instantaneously drops down.

That is, since a damping force of a set specific section can be variably increased or reduced, the ride comfort of the vehicle can be improved and simultaneously the steering stability can be ensured.

Although not illustrated, one or more cutaway grooves 400 may be formed at the edge of the magnetic core 100.

In addition, the stop rubber 500 may be further connected to the top surface of the upper plate 300-1. The edge of the stop rubber 500 may be spaced apart from the upper end of the cutaway groove 400.

That is, even when the stop rubber 500 is installed at the central position of the upper plate 300-1, the stop rubber 500 and the cutaway groove 400 do not contact each other and can remove interference at the time of bypass.

Consequently, since the bypass space that is not affected by the electromagnetic field is formed at a part of the main passage 110, the cutaway groove 400 is formed corresponding to both directions. Therefore, it is unnecessary to match the direction of the passage to thereby achieve ease of assembling. In addition, it is unnecessary to form the bypass holes in the upper plate 300-1 and the lower plate 300-2 to thereby reduce processing costs.

According to the present invention, since the bypass space can be formed in a part of the main passage, it is possible to easily secure the installation space of the stop rubber 500 and prevent the interference between the stop rubber 500 and the bypass space.

The MR dampers according to specific embodiments of the present invention have been described, but it is obvious that various modifications can be made thereto without departing from the scope of the present invention.

While the embodiments of the present invention have been described with reference to the specific embodiments, it will be apparent to those skilled in the art that various changes and modifications may be made without departing from the spirit and scope of the invention as defined in the following claims.

Description of Reference Numerals

| 10: cylinder | 11: compression chamber |
|---|---|
| 12: rebound chamber | 20: piston rod |
| 30: magnetic generator | 31: coil |
| 100: magnetic core | 110: main passage |
| 120: connection groove | 200: flux ring |
| 300-1: upper plate | 310-1: first passage |
| 300-2: lower plate | 310-2: second passage |
| 400: cutaway groove | 500: stop rubber |
| O: MR fluid | |

What is claimed is:

1. A magnetorheological (MR) damper, which includes a cylinder filled with an MR fluid, a piston rod extending to an outside of the cylinder, and a magnetic generator partitioning an inside of the cylinder into a compression chamber and a rebound chamber in a state of being connected to the piston rod and generating an electromagnetic force to the inside of the cylinder, the MR damper comprising:
   a magnetic core connected to a lower end of the piston rod;
   a flux ring connected to an edge of the magnetic core, such that a side surface of the flux ring tightly contacts an inner peripheral surface of the cylinder, the flux ring being formed to vertically penetrate through a main passage between the flux ring and the magnetic core;
   a cutaway groove concavely formed at a side surface of the magnetic core and preventing a magnetic force from being unnecessarily formed at a setting portion of the main passage, such that the MR fluid is vertically bypassed during compression and rebound strokes; and
   a ring-shaped connection groove at the edge of the magnetic core,
   wherein the cutaway groove vertically penetrates and is formed at upper and lower sides of the magnetic core and a vertically extending side surface of the connection groove.

2. The MR damper according to claim 1, wherein the magnetic generator is connectable in a state of being inserted into the side surface of the connection groove.

3. The MR damper according to claim 2, wherein the cutaway groove vertically penetrates and is formed at upper and lower portions of the magnetic core with respect to the connection groove.

4. The MR damper according to claim 1, wherein an upper plate, in which a first passage vertically penetrates to be connected to an upper end of the main passage, is further connected to upper portions of the magnetic core and the flux ring, and
   a lower plate, in which a second passage vertically penetrates to be connected to a lower end of the main passage, is further connected to lower portions of the magnetic core and the flux ring.

5. The MR damper according to claim 1, wherein a stop rubber is further connected to a top surface of an upper plate, and an edge of the stop rubber is spaced apart from an upper end of the cutaway groove.

* * * * *